United States Patent
Matsumoto (10) Patent No.: US 11,181,180 B2
(45) Date of Patent: Nov. 23, 2021

(54) MOTOR-INTEGRATED TRANSMISSION DEVICE

(71) Applicant: HONDA MOTOR CO., LTD., Tokyo (JP)

(72) Inventor: Takuya Matsumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/764,894

(22) PCT Filed: Nov. 22, 2017

(86) PCT No.: PCT/JP2017/042067
§ 371 (c)(1),
(2) Date: May 18, 2020

(87) PCT Pub. No.: WO2019/102559
PCT Pub. Date: May 31, 2019

(65) Prior Publication Data
US 2020/0340573 A1    Oct. 29, 2020

(51) Int. Cl.
| | |
|---|---|
| *F16H 57/02* | (2012.01) |
| *H02K 7/10* | (2006.01) |
| *F16H 57/027* | (2012.01) |
| *H02K 7/116* | (2006.01) |
| *A01D 34/68* | (2006.01) |
| *A01D 34/69* | (2006.01) |

(52) U.S. Cl.
CPC ....... *F16H 57/027* (2013.01); *A01D 34/6806* (2013.01); *H02K 7/116* (2013.01); *A01D 34/69* (2013.01); *F16H 2057/02034* (2013.01)

(58) Field of Classification Search
CPC ......... F16H 57/027; F16H 2057/02034; A01D 34/6806; A01D 34/69; A01D 69/02; A01D 2101/00; H02K 7/116
See application file for complete search history.

(56) References Cited

U.S. PATENT DOCUMENTS 10,837,537 B2 * 11/2020 Yoshimura ............. H02K 7/116
2013/0307320 A1 * 11/2013 Akamatsu ............ B60K 7/0007
301/6.5

FOREIGN PATENT DOCUMENTS

| JP | 2013-224710 | 10/2013 | |
|---|---|---|---|
| WO | WO-2009139234 A1 * | 11/2009 | ........... F16H 57/027 |
| WO | WO-2011065179 A1 * | 6/2011 | ........... B60K 17/046 |

OTHER PUBLICATIONS

International Search Report and Written Opinion for International Application No. PCT/JP2017/042067 dated Feb. 13, 2018, 8 pages.

* cited by examiner

*Primary Examiner* — Adam D Rogers
(74) *Attorney, Agent, or Firm* — Amin, Turocy & Watson, LLP (57) ABSTRACT

This motor-integrated transmission device is provided with: a motor provided with an output shaft; a gear train; and a case. A breather part is provided which allows communication between an internal space of the motor-integrated transmission device and the outside. A case internal space and a motor internal space communicate with each other through a connection flow path provided in a different place to an insertion part of the case. The case internal space and the motor internal space communicate with the breather part.

12 Claims, 6 Drawing Sheets

MOTOR-INTEGRATED TRANSMISSION DEVICE

TECHNICAL FIELD

The present invention relates to a motor-integrated transmission device in which a motor and a transmission are integrated together.

BACKGROUND ART

Motor-integrated transmission devices in which a motor and a transmission are integrated together are conventionally known (refer to Japanese Laid-Open Patent Publication No. 2013-224710, for example). Transmission devices of this type include a motor, a gear train driven by the motor, and a case (reduction case) accommodating the gear train, and a lubricant, such as grease, is contained in the case.

SUMMARY OF INVENTION

A structure (breather) for enabling air to flow into and out of the transmission device may be provided in order to cool the transmission device and to suppress occurrence of pressure difference between the inside and outside of the transmission device. In this case, when only one of the motor and the transmission is provided with a breather, a temperature difference formed between the two causes a flow of air through a hole in which the output shaft of the motor is inserted. However, if the hole is closed by the lubricant in the transmission, then the breathing function (cooling function and pressure difference suppression function) is not realized in one of the motor and the transmission where the breather is not provided.

The present invention has been devised taking such a problem into consideration and an object of the present invention is to provide a motor-integrated transmission device that can achieve a superior breathing function with one breather.

In order to achieve the object above, a motor-integrated transmission device of the present invention includes a motor including an output shaft, a gear train driven by the motor, and a case that includes an insertion portion through which the output shaft of the motor is inserted and that accommodates the gear train, the motor being fixed to the case. A breather is provided to allow an interior space of the motor-integrated transmission device and the outside thereof to communicate with each other. An in-case space being an interior space of the case in which the gear train is arranged and an in-motor space being an interior space of the motor communicate with each other through a connecting passage located in a position different from a position of the insertion portion of the case, and the in-case space and the in-motor space communicate with the breather.

According to the transmission device of the present invention constructed as described above, the in-case space and the in-motor space communicate with each other through the connecting passage located in a position different from the position of the insertion portion through which the output shaft of the motor is inserted. Accordingly, even if the insertion portion is clogged with lubricant, air flows between the in-case space and the in-motor space through the connecting passage. Consequently, it is possible to obtain a superior breathing function with one breather.

The case may include a passage disposed in a position that is offset from the gear train, and the connecting passage may communicate with the in-case space through the passage.

This configuration reliably prevents the lubricant from flowing into the connecting passage.

The connecting passage may be located above the insertion portion of the case.

This configuration further reliably prevents the lubricant from flowing into the connecting passage.

At least part of the passage may be located above the insertion portion of the case.

This configuration reliably prevents the lubricant from flowing into the connecting passage.

The passage may include a horizontal passage located above the output shaft of the motor and extending in a horizontal direction, and a vertical passage connected to the horizontal passage and extending in a vertical direction.

This configuration reliably prevents the lubricant from flowing into the connecting passage.

The horizontal passage may extend in parallel with the output shaft.

This configuration allows the horizontal passage to be positioned in the case easily.

The passage may include an opening that opens in the in-case space, and a wall facing the opening may be provided between the opening and a bottom of the case.

With this configuration, the wall functions as a barrier and prevents the lubricant from flowing into the passage.

The wall may be a gear member that constitutes the gear train.

This configuration eliminates the need to provide a dedicated wall and streamlines the structure.

The case may include a space forming wall portion that forms the in-case space, and a passage forming wall portion that forms the passage. An opening forming portion of the passage forming wall portion that surrounds the opening may protrude from the space forming wall portion into the in-case space.

This configuration further reliably prevents the lubricant from flowing into the connecting passage.

The motor-integrated transmission device may further include a motor mount which is disposed between the case and the motor, and to which the motor is fixed. The connecting passage may be a through hole formed in the motor mount.

With this configuration, it is possible to easily provide the connecting passage by utilizing the motor mount.

The breather may be provided in the motor mount.

It is thus possible to make the breather communicate with the in-case space and the in-motor space with a simple structure.

The motor mount may be provided with a communicating hole that communicates with the connecting passage and the breather, and the communicating hole may be located in a position that is offset from the connecting passage in a circumferential direction around the insertion portion.

This allows the breather to be arranged freely.

DESCRIPTION OF EMBODIMENTS

The motor-integrated transmission device according to the present invention will be described below referring to the accompanying drawings in conjunction with preferred embodiments.

Figure 1:
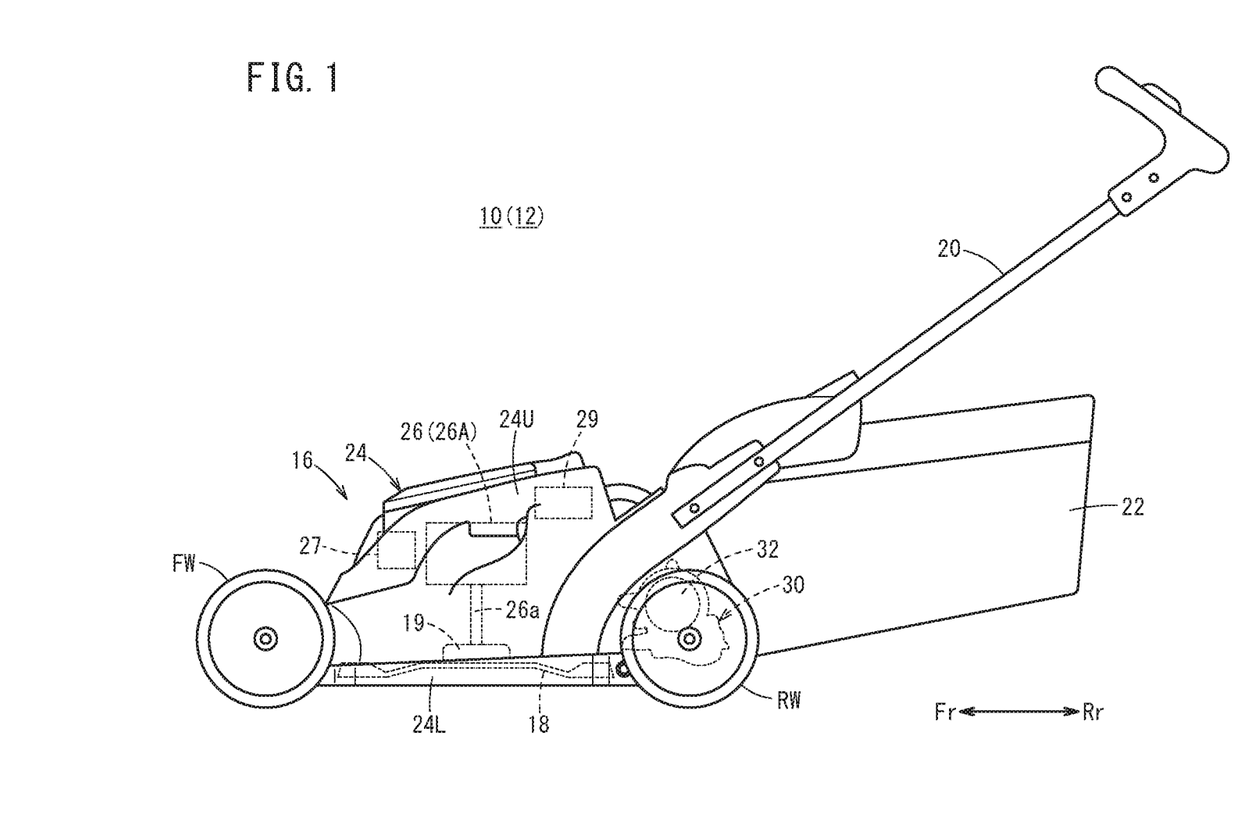
FIG. 1 is a perspective view of a lawn mower having a transmission device according to an embodiment of the present invention.

A work machine 10 shown in FIG. 1 is a walk-type self-propelled lawn mower 12 for cutting the grass on lawns. In FIG. 1, the arrow Fr shows the forward direction of the lawn mower 12 (the same direction as the forward direction seen from an operator), and the arrow Rr shows the rearward direction of the lawn mower 12 (the same direction as the rearward direction seen from the operator). "Right side" and "left side" of the lawn mower 12 respectively denote the right side and the left side seen from the operator who uses the lawn mower 12.

The lawn mower 12 includes a machine body 16, right and left front wheels FW disposed in the front part of the machine body 16, right and left rear wheels RW disposed in the rear part of the machine body 16, a grass-cutting cutter blade 18 disposed at the bottom of the machine body 16, an operation handle 20 extending rearward from the machine body 16, and a mown grass storage 22 attached at the rear of the machine body 16.

The machine body 16 has a housing 24 that constitutes the exterior shape of the machine body 16, and a driving source 26 for driving the cutter blade 18. The driving source 26 is a motor 26A in this embodiment, but an engine may be used in place of the motor 26A. The housing 24 is a casing that is opened downward only in a part facing the ground (lawn).

The housing 24 includes a lower housing 24L that is opened downward, and an upper housing 24U protruding upward from the top of the lower housing 24L. The upper housing 24U contains the motor 26A, a battery 27 for supplying electric power to the motor 26A, and a control unit 29 configured to control the motor 26A. The cutter blade 18 is accommodated inside the lower housing 24L.

The motor 26A has an output shaft 26a projecting downward and extending into the housing 24. The cutter blade 18 is coupled to the output shaft 26a of the motor 26A through a blade holder 19, and rotated by the rotational driving force transmitted from the output shaft 26a. The cutter blade 18 is a plate-like, elongated member (so-called bar blade).

Figure 2:
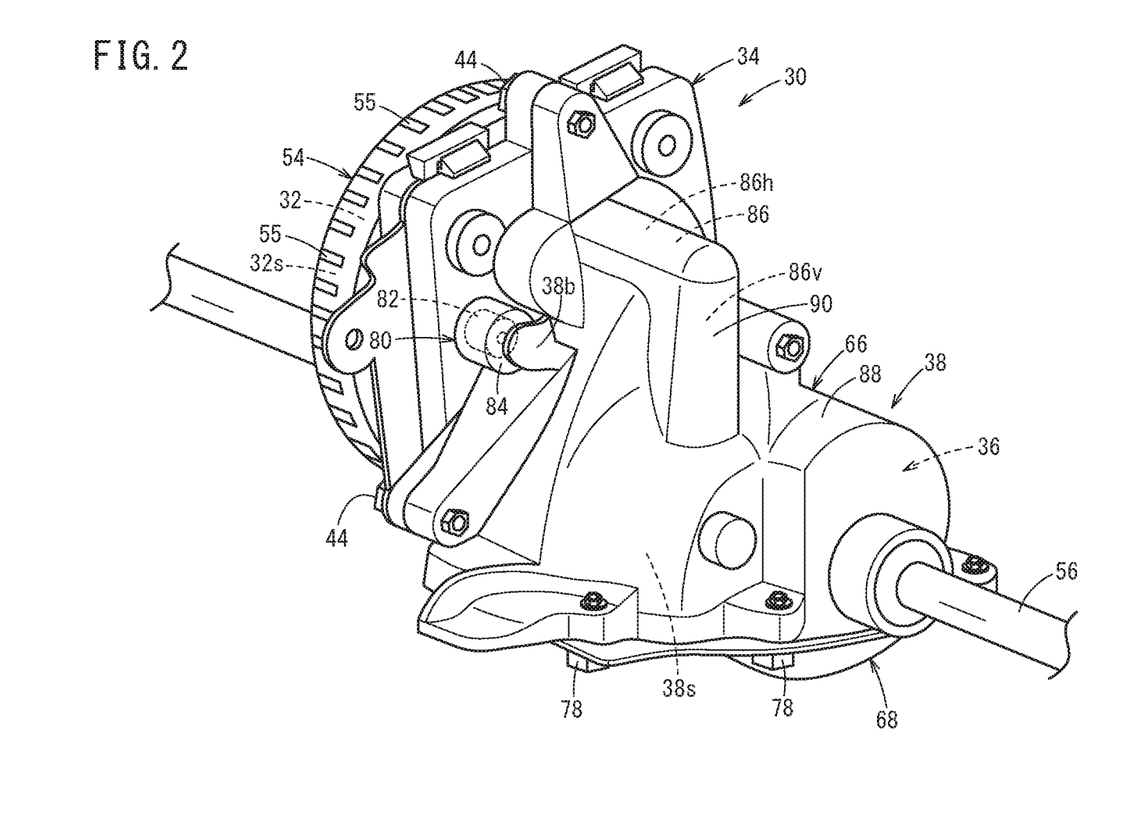
FIG. 2 is a perspective view of the transmission device.
Figure 3:
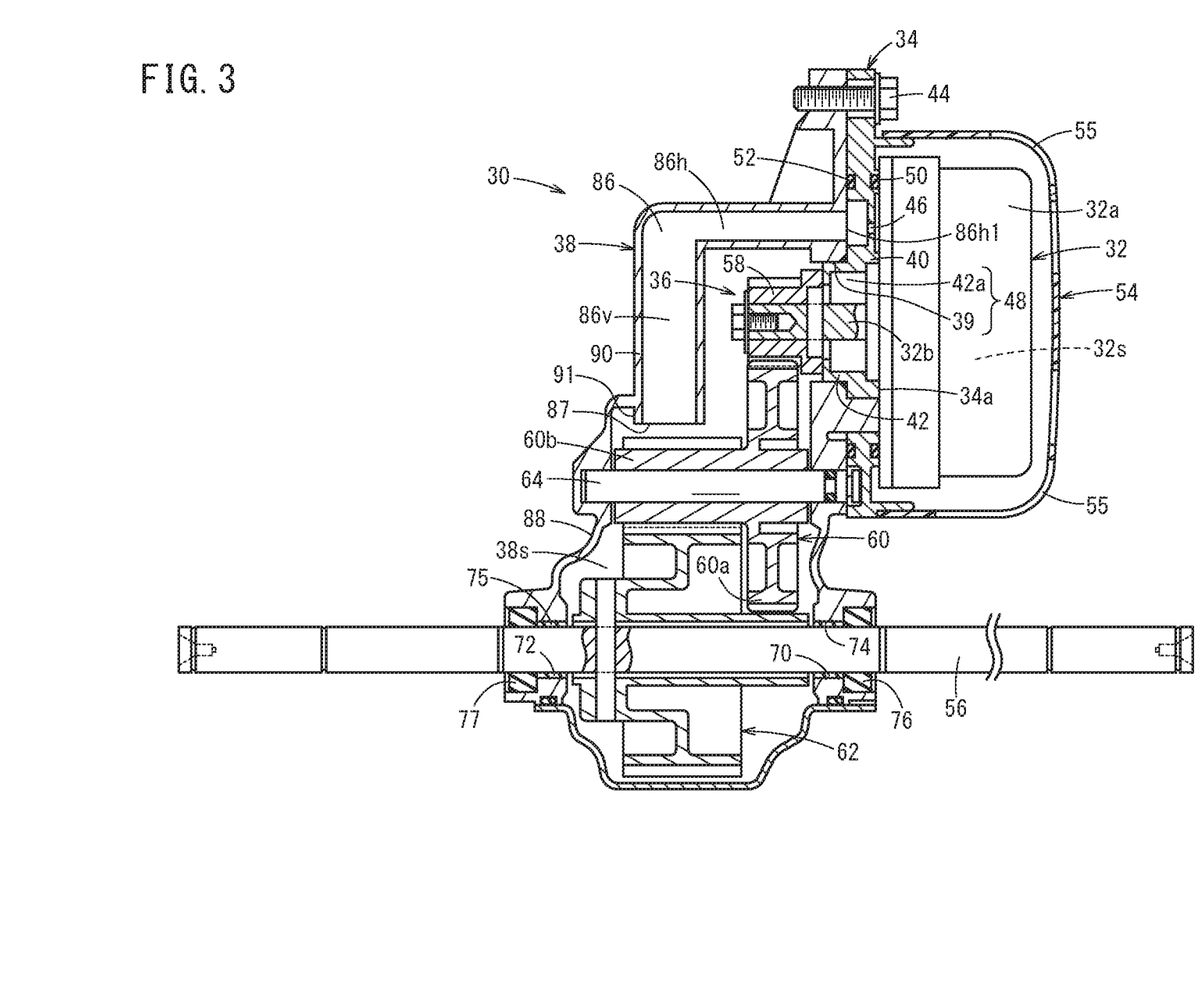
FIG. 3 is a cross sectional view of the transmission device.

The lawn mower 12 further includes a motor-integrated transmission device 30 for driving the rear wheels RW (which will hereinafter be simply referred to as the "transmission device 30"). As shown in FIGS. 2 and 3, the transmission device 30 includes a motor 32 serving as a traveling power source for driving the rear wheels RW, a motor mount 34 to which the motor 32 is fixed, a gear train 36 driven by the motor 32, and a case 38 (reduction case) accommodating the gear train 36.

In FIG. 3, the motor 32 includes a motor body 32a including a rotor and a stator therein, and an output shaft 32b projecting in the axial direction from a center of the motor body 32a. The output shaft 32b extends in the right-left direction of the machine body 16 and is inserted in an insertion hole 39 formed in the case 38. The motor 32 is controlled by the control unit 29 shown in FIG. 1 and rotationally driven by the electric power supplied from the battery 27.

The motor mount 34 is disposed between the motor 32 and the case 38 and is an adapter member for attaching the motor 32 to the case 38. The motor mount 34 includes a plate portion 40 formed like a plate, and a tubular portion 42 protruding to the housing 24 side from a center part of the plate portion 40. The outer peripheral part of the plate portion 40 is fixed to the case 38 by bolts 44. The plate portion 40 has a connecting passage 46 penetrating through the plate portion 40 in its thickness direction. An interior space of the case 38 in which the gear train 36 is arranged (hereinafter referred to as an "in-case space 38s") and an interior space of the motor 32 (hereinafter referred to as an "in-motor space 32s") communicate with each other through the connecting passage 46.

The tubular portion 42 has an opening 42a. The opening 42a communicates with the in-case space 38s. The output shaft 32b of the motor 32 is inserted in the opening 42a. The opening 42a and the insertion hole 39 of the case 38 form an insertion portion 48 through which the output shaft 32b is inserted. The connecting passage 46 mentioned above is disposed in a position different from the position of the opening 42a. In this embodiment, the connecting passage 46 is located in a position higher in the vertical direction than the insertion hole 39 of the case 38 and the opening 42a of the motor mount 34.

A ring-like seal member 50 is disposed between the motor 32 and the motor mount 34. A ring-like seal member 52 is disposed between the case 38 and the motor mount 34. The connecting passage 46 is positioned inside of the seal members 50, 52 (on the side closer to the opening 42a). A motor cover 54 covering the motor 32 is attached to the motor mount 34. The motor cover 54 is provided with a large number of air holes 55 for allowing the inside and outside of the motor cover 54 to communicate with each other.

The gear train 36 includes a plurality of gears. The rotational speed of the motor 32 is reduced by the gear train 36 and transmitted to a drive shaft 56 (axle), both ends of which are coupled to the rear wheels RW (see FIG. 1). Specifically, the gear train 36 includes an input gear 58 (first gear) fixed to the output shaft 32b of the motor 32, an intermediate gear 60 (second gear) meshing with the input gear 58, and an output gear 62 (third gear) meshing with the intermediate gear 60. The input gear 58, the intermediate gear 60, and the output gear 62 are arranged in parallel with each other.

The input gear 58 is fixed coaxially with the output shaft 32b and rotates integrally with the output shaft 32b. The intermediate gear 60 is rotatably supported by a support shaft 64 that is supported by the case 38 in parallel with the output shaft 32b. The intermediate gear 60 includes a first gear portion 60a that meshes with the input gear 58, and a second gear portion 60b that has a smaller diameter than the first gear portion 60a and that meshes with the output gear 62. The output gear 62 is coaxially fixed to the drive shaft 56 in a relatively rotatable manner. The drive shaft 56 passes through a center part of the output gear 62 and rotates integrally with the output gear 62.

For convenience of illustration, FIG. 3 shows a cross section of the upper part above the support shaft 64 along the vertical direction, and shows a cross section of the lower part that is taken in the plane including the center line of the support shaft 64 and the center line of the drive shaft 56 (a plane inclined with respect to the horizontal plane).

The case 38 includes a case body 66 accommodating the gear train 36 and rotatably supporting the drive shaft 56, and an oil pan 68 disposed at the bottom of the case body 66. The case body 66 has support holes 70, 72 through which the drive shaft 56 is inserted. Hollow cylindrical bushes 74, 75 and seal members 76, 77 are disposed in the support holes 70, 72. The bushes 74, 75 rotatably support the drive shaft 56. The seal members 76, 77 prevent the entry of water, dust, dirt, etc. into the case 38.

Figure 4:
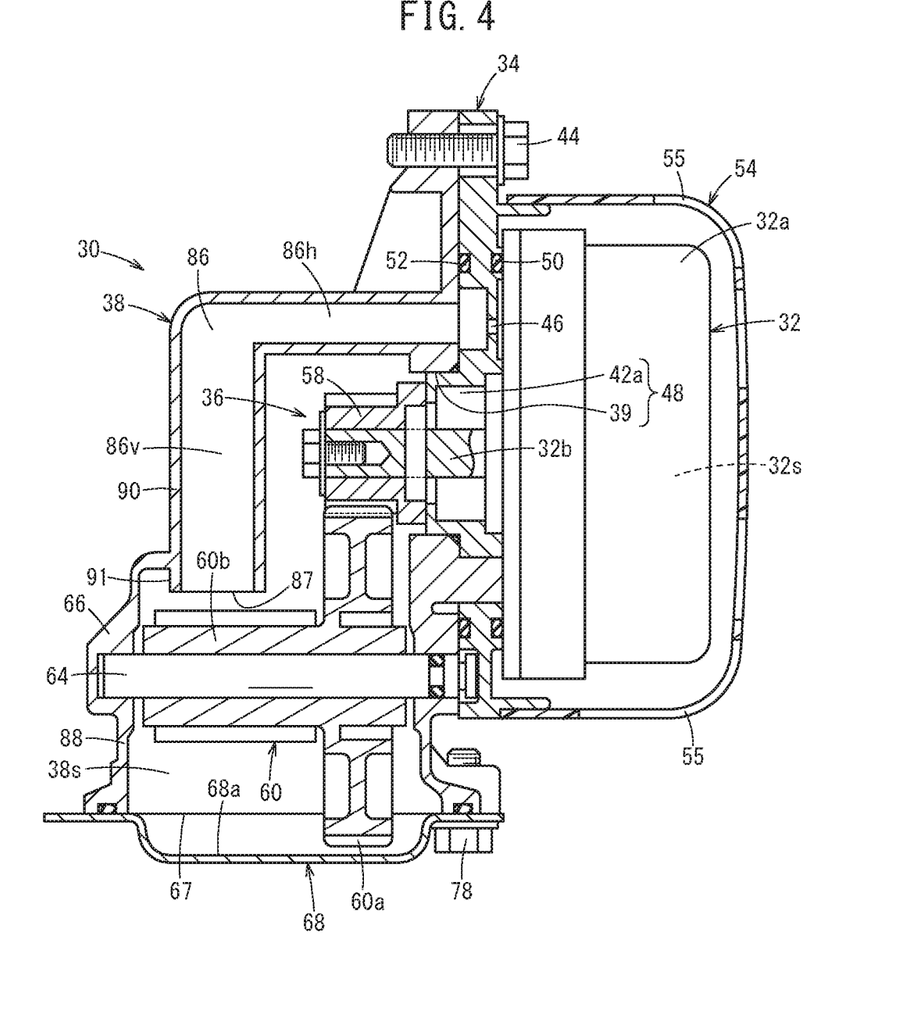
FIG. 4 is another cross sectional view of the transmission device.

As shown in FIG. 4, a lower opening 67 opening downward is formed in a lower part of the case body 66. The lower opening 67 is closed by the oil pan 68. The oil pan 68 is fixed at the bottom of the case body 66 by a plurality of bolts 78. The oil pan 68 has a recess 68a that is recessed downward. Part of the output gear 62 is inserted in the recess 68a.

The case 38 contains a lubricant (not shown) for lubricating the gear train 36. In this embodiment, the lubricant is a semisolid lubricant (grease). The lubricant may be a liquid lubricant (lubricant oil).

In FIG. 2, the transmission device 30 is provided with a breather 80 for allowing the interior space of the transmission device 30 and the outside thereof to communicate with each other. The in-case space 38s and the in-motor space 32s communicate with the breather 80. The breather 80 is provided on the motor mount 34.

Figure 6:
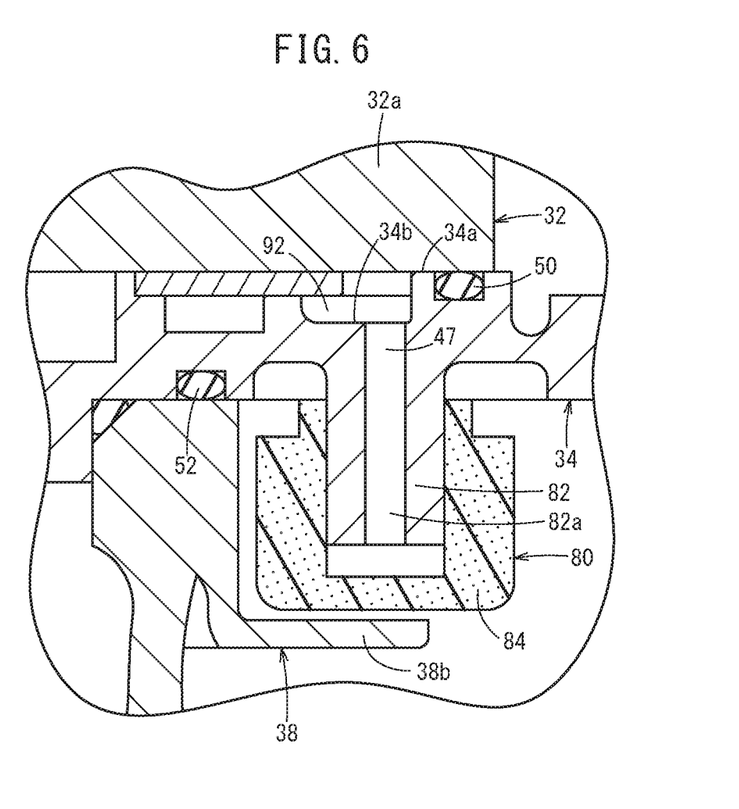
FIG. 6 is a cross sectional view of a breather.

As shown in FIG. 6, the breather 80 includes an air pipe 82 projecting away from the motor 32, and a breather cap 84 attached to the air pipe 82. The air pipe 82 communicates with an air passage 92 formed between the motor mount 34 and the motor 32. The breather cap 84 is made of a porous material having air-permeability. The breather cap 84 is prevented from coming off the air pipe 82 by a protrusion 38b formed on the case 38.

As shown in FIG. 3, the case 38 has a passage 86 that is located in a position offset from the gear train 36. The connecting passage 46 described above communicates with the in-case space 38s through the passage 86. At least part of the passage 86 is located above the insertion portion 48. The passage 86 has an opening 87 opening in the in-case space 38s.

More specifically, the passage 86 includes a horizontal passage 86h located above the output shaft 32b of the motor 32 and extending in a horizontal direction, and a vertical passage 86v connected to the horizontal passage 86h and extending in a vertical direction. The passage 86 is hence formed in an L-shape. The horizontal passage 86h extends in parallel with the output shaft 32b. The shape of the passage 86 is not limited to the shape of this embodiment and need not necessarily be formed in an L-shape. The horizontal passage 86h may extend in a direction intersecting the output shaft 32b. The vertical passage 86v may extend in a direction intersecting the vertical direction.

An opening of the passage 86 on the motor mount 34 side (an opening 86h1 of the horizontal passage 86h) is located in a position that faces the connecting passage 46 formed in the motor mount 34. The vertical passage 86v is located in a position that faces the output shaft 32b and the input gear 58 on the center line of the output shaft 32b.

The case 38 has a space forming wall portion 88 that forms the in-case space 38s serving as a gear case, and a passage forming wall portion 90 that forms the passage 86. The passage forming wall portion 90 is formed integrally with the space forming wall portion 88. The passage forming wall portion 90 may be a separate component attached to the space forming wall portion 88.

As shown in FIG. 4, a wall that faces the opening 87 is provided between the opening 87 of the passage 86 and the bottom of the case 38 (oil pan 68). In this embodiment, this wall is the intermediate gear 60 (gear member) that constitutes the gear train 36. That is, the intermediate gear 60 is disposed right under the opening 87 so as to cover the opening 87. An opening forming portion 91 of the passage forming wall portion 90 that surrounds the opening 87 protrudes from the space forming wall portion 88 into the in-case space 38s.

Figure 5:
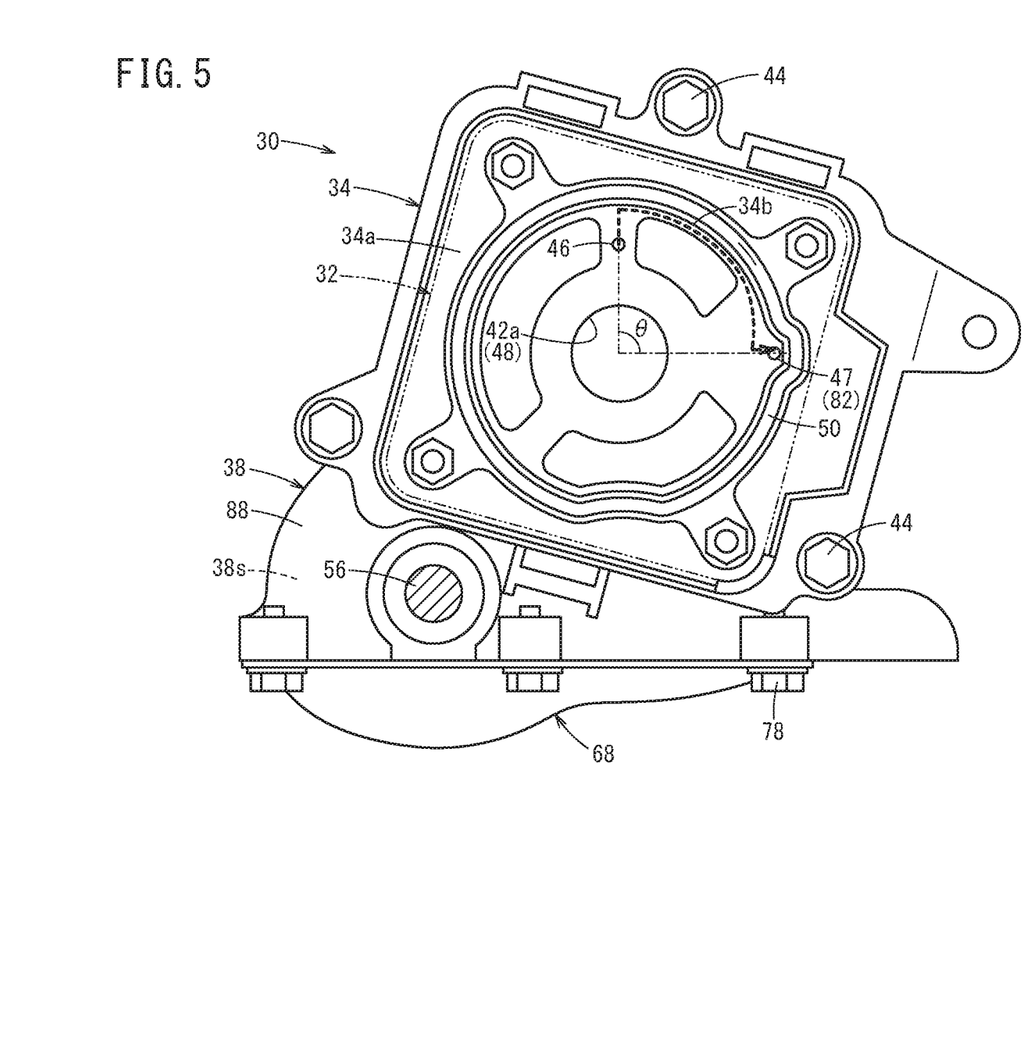
FIG. 5 is a side view of the transmission device from which a motor and a motor cover have been removed.

As shown in FIGS. 5 and 6, an air passage groove 34b extending in a circumferential direction is formed in a surface 34a of the motor mount 34 on which the motor 32 is fixed. The passage groove 34b communicates with the connecting passage 46 and a hollow portion 82a of the air pipe 82. The passage groove 34b and the motor 32 form the air passage 92. Accordingly, the hollow portion 82a of the air pipe 82 communicates with the passage 86 of the case 38 shown in FIGS. 3 and 4 through the passage groove 34b (air passage 92) and the connecting passage 46. The motor mount 34 has a communicating hole 47 passing through the motor mount 34 in its thickness direction. The communicating hole 47 communicates with the connecting passage 46 through the passage groove 34b and with the breather 80 (air pipe 82). As shown in FIG. 5, the communicating hole 47 is disposed in a position that is offset from the connecting passage 46 by an angle θ in the circumferential direction around the insertion portion 48.

The work machine 10 (lawn mower 12) thus constructed operates as shown below.

With the lawn mower 12 shown in FIG. 1, when the cutter blade 18 rotates clockwise in plan view under the driving action of the motor 26A, the cutter blade 18 cuts the grass on the lawn right beneath the lawn mower 12. At this time, an air current (swirling wind) swirling in the same direction as the cutter blade 18 is formed inside the lower housing 24L. Then, the cut grass (mown grass) is sent into the mown grass storage 22 by the conveying wind (swirling wind) thus generated.

On the other hand, the driving force of the travel motor 32 is transmitted to the right and left rear wheels RW through the gear train 36 of the transmission device 30 and the drive shaft 56. Thus, the rear wheels RW rotate to cause the lawn mower 12 to move forward. Then, in the transmission device 30 shown in FIG. 3, the lubricant contained in the case 38 lubricates the gear train 36. Further, with the transmission device 30, the inside and outside of the transmission device 30 communicate with each other through the breather 80 (FIGS. 2, 6) such that air can flow therebetween. Therefore, the interior of the transmission device 30 is cooled, and occurrence of pressure difference between the inside and outside of the device is suppressed.

In this case, the transmission device 30 of this embodiment offers the effects below.

According to the transmission device 30, the in-case space 38s and the in-motor space 32s communicate with each other through the connecting passage 46 formed in a position different from the position of the insertion portion 48 (insertion hole 39 and opening 42a) through which the output shaft 32b of the motor 32 is inserted. Accordingly, even if the insertion portion 48 is clogged with the lubricant, air flows between the in-case space 38s and the in-motor space 32s through the connecting passage 46. Consequently, it is possible to obtain a superior breathing function with the single breather 80.

The case 38 has the passage 86 disposed in a position that is offset from the gear train 36, and the connecting passage 46 communicates with the in-case space 38s through the passage 86. This configuration reliably prevents the lubricant from flowing into the connecting passage 46.

The connecting passage 46 is located above the insertion portion 48 through which the output shaft 32b of the motor 32 is inserted. This configuration further reliably prevents the lubricant from flowing into the connecting passage 46.

At least part of the passage 86 is located above the insertion portion 48 through which the output shaft 32b of the motor 32 is inserted. This configuration reliably prevents the lubricant from flowing into the connecting passage 46.

The passage 86 includes the horizontal passage 86h located above the output shaft 32b of the motor 32 and extending in a horizontal direction, and the vertical passage 86v connected to the horizontal passage 86h and extending in a vertical direction. This configuration reliably prevents the lubricant from flowing into the connecting passage 46.

The horizontal passage 86h extends in parallel with the output shaft 32b. This configuration allows the horizontal passage 86h to be positioned in the case 38 easily.

The passage 86 has the opening 87 that opens in the in-case space 38s. A wall facing the opening 87 is provided between the opening 87 and the bottom of the case 38. With this configuration, the wall functions as a barrier and prevents the lubricant from flowing into the passage 86.

The wall is a gear member (intermediate gear 60) that constitutes the gear train 36. This configuration eliminates the need to provide a dedicated wall and streamlines the structure.

The case 38 has the space forming wall portion 88 forming the in-case space 38s, and the passage forming wall portion 90 forming the passage 86. The opening forming portion 91 of the passage forming wall portion 90 that surrounds the opening 87 protrudes from the space forming wall portion 88 into the in-case space 38s. This configuration further reliably prevents the lubricant from flowing into the connecting passage 46.

The motor-integrated transmission device 30 further includes the motor mount 34 which is disposed between the case 38 and the motor 32, and to which the motor 32 is fixed. The connecting passage 46 is a through hole formed in the motor mount 34. With this configuration, it is possible to easily provide the connecting passage 46 by utilizing the motor mount 34.

The breather 80 is provided in the motor mount 34. It is thus possible to make the breather 80 communicate with the in-case space 38s and the in-motor space 32s with a simple structure.

The motor mount 34 is provided with the communicating hole 47 that communicates with the connecting passage 46 and the breather 80, and the communicating hole 47 is located in a position that is offset from the connecting passage 46 in the circumferential direction around the insertion portion 48. This allows the breather 80 to be arranged freely.

The transmission device 30 can be applied also to work machines 10 other than the lawn mower 12. The transmission device 30 can be applied also to machines other than the work machine 10.

The present invention is not limited to the embodiments described above but can be modified in various manners without departing from the essence and gist of the present invention.

What is claim is:

1. A motor-integrated transmission device comprising a motor including an output shaft, a gear train driven by the motor, and a case that includes an insertion portion through which the output shaft of the motor is inserted and that accommodates the gear train, the motor being fixed to the case,
   wherein a breather is provided to allow an interior space of the motor-integrated transmission device and an outside thereof to communicate with each other,
   an in-case space being an interior space of the case in which the gear train is arranged and an in-motor space being an interior space of the motor communicate with each other through a connecting passage located in a position different from a position of the insertion portion of the case, and
   the in-case space and the in-motor space communicate with the breather.

2. The motor-integrated transmission device according to claim 1, wherein
   the case includes a passage disposed in a position that is offset from the gear train, and
   the connecting passage communicates with the in-case space through the passage.

3. The motor-integrated transmission device according to claim 2, wherein at least part of the passage is located above the insertion portion of the case.

4. The motor-integrated transmission device according to claim 2, wherein the passage includes a horizontal passage located above the output shaft of the motor and extending in a horizontal direction, and a vertical passage connected to the horizontal passage and extending in a vertical direction.

5. The motor-integrated transmission device according to claim 4, wherein the horizontal passage extends in parallel with the output shaft.

6. The motor-integrated transmission device according to claim 2, wherein
   the passage includes an opening positioned in the in-case space, and
   a wall facing the opening is provided between the opening and a bottom of the case.

7. The motor-integrated transmission device according to claim 6, wherein the wall is formed from a portion of a gear member which forms part of the gear train.

8. The motor-integrated transmission device according to claim 6, wherein
   the case includes a space forming wall portion that forms the in-case space, and a passage forming wall portion that forms the passage, and
   an opening forming portion of the passage forming wall portion that surrounds the opening protrudes from the space forming wall portion into the in-case space.

9. The motor-integrated transmission device according to claim 1, wherein the connecting passage is located above the insertion portion of the case.

10. The motor-integrated transmission device according to claim 1, further comprising a motor mount which is disposed between the case and the motor, and to which the motor is fixed, wherein
    the connecting passage is a through hole formed in the motor mount.

11. The motor-integrated transmission device according to claim 10, wherein the breather is provided in the motor mount.

12. The motor-integrated transmission device according to claim 10, wherein
    the motor mount is provided with a communicating hole that communicates with the connecting passage and the breather, and
    the communicating hole is located in a position that is offset from the connecting passage in a circumferential direction around the insertion portion.

* * * * *